United States Patent
Shibuya et al.

(10) Patent No.: US 7,105,835 B2
(45) Date of Patent: Sep. 12, 2006

(54) RADIATION DETECTOR

(75) Inventors: Kengo Shibuya, Tokyo (JP); Masanori Koshimizu, Tokyo (JP); Yuko Takeoka, Kanagawa (JP); Keisuki Asai, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/451,761

(22) PCT Filed: Jul. 16, 2002

(86) PCT No.: PCT/JP02/07235

§ 371 (c)(1),
(2), (4) Date: Jun. 23, 2003

(87) PCT Pub. No.: WO03/012476

PCT Pub. Date: Feb. 13, 2003

(65) Prior Publication Data

US 2004/0129922 A1 Jul. 8, 2004

(30) Foreign Application Priority Data

Jul. 31, 2001 (JP) .............................. 2001-231205
Mar. 7, 2002 (JP) .............................. 2002-061579

(51) Int. Cl.
*C09K 11/08* (2006.01)
*C09K 11/06* (2006.01)
*G01T 1/00* (2006.01)

(52) U.S. Cl. ................. 250/483.1; 252/301.36
(58) Field of Classification Search ............. 250/483.1, 250/486.1, 366, 367, 393, 370.11, 370.12; 252/301.36, 301.16, 301.18; 428/690
See application file for complete search history.

(56) References Cited

U.S. PATENT DOCUMENTS

| | | | | |
|---|---|---|---|---|
| 5,594,253 A | * | 1/1997 | Bueno et al. | ............ 250/486.1 |
| 5,636,299 A | * | 6/1997 | Bueno et al. | ................. 385/15 |
| 5,864,141 A | | 1/1999 | Majewski et al. | ..... 250/363.02 |
| 5,866,907 A | * | 2/1999 | Drukier et al. | ............. 250/366 |
| 5,882,548 A | * | 3/1999 | Liang et al. | .......... 252/301.16 |
| 6,216,540 B1 | * | 4/2001 | Nelson et al. | ................ 73/633 |
| 6,787,250 B1 | * | 9/2004 | Shibuya et al. | ............. 428/690 |
| 6,838,198 B1 | * | 1/2005 | Tallon | ........................ 428/702 |
| 2003/0106483 A1 | | 6/2003 | Sugawara | ..................... 117/19 |

FOREIGN PATENT DOCUMENTS

EP  1 258 736 A  11/2002

(Continued)

OTHER PUBLICATIONS

U.S. Appl. No. 10/182,924, filed Dec. 7, 2001, Shibuya.

(Continued)

*Primary Examiner*—David Porta
*Assistant Examiner*—Faye Boosalis
(74) *Attorney, Agent, or Firm*—Gry C Cohn PLLC

(57) ABSTRACT

This invention provides a radiation detector using a scintillator having both a strong luminescence intensity and a short time constant. The radiation detector comprises as a scintillator an organic/inorganic perovskite hybrid compound represented by the general formula $AMX_3$, wherein A is $R—NH_3$ or $R'—NH_2$, or a mixture thereof, R is a hydrogen atom or a methyl group which may be substituted by an amino group or a halogen atom, R' is a methylene group which may be substituted by an amino group or a halogen atom, each X is a halogen atom that may be identical to or different from the other X groups, and M is a Group IVa metal, Eu, Cd, Cu, Fe, Mn or Pd.

6 Claims, 3 Drawing Sheets

FOREIGN PATENT DOCUMENTS

WO 03/042715 5/2002

OTHER PUBLICATIONS

U.S. Appl. No. 10/451,755, filed Jul. 29, 2002, Shibuya.

Mitzi, Templating and Structural Engineering in Organic-Inorganic Perovskites, Journal of Chemical Society, Dalton Trans., 2001, pp. 1-12.

Ishihara et al., Exciton State in Two-Dimensional Perovskite Semiconductor $(C_{10}H_{21}NH_3)_2PbI_4$, Solid State Communications, vol. 69, No. 9, 1989, pp. 933-936.

Sugahara et al., Experimental Evidence of Pairing Fractional Quantum Hall Effect State in High Temperture Oxide Superconductors . . . , Physica C 317-318, 1999, 618-620.

Sugahara et al., Anomalous AC Dielectric Response and Carrier State of C-Axis Oriented $La_{2-x}Sr_xCuO_4$ Films, Physica C 293, 1997, 216-219.

* cited by examiner

Intensity / a.u. (log)

Time / ps

RADIATION DETECTOR

TECHNICAL FIELD OF THE INVENTION

This invention relates to a radiation detector for ionizing radiations, such as γ-rays, X-rays, electron beams, heavy charged particle beams and neutron beams, and more specifically, having a very short time from a rise to a disappearance of luminescence of subnanosecond order.

PRIOR ART

A scintillator detects and measures ionizing radiation optically by using a solid radiation relaxation phenomenon. In recent years, in fields such as physics, chemistry, biology and medicine, the use of short-pulsed radiation is becoming more widespread and simple methods of measuring short-pulsed radiation are required. For example, in the case of a PET (positron emission tomography) which is a medical device, the time resolution of the scintillator is directly linked to the spatial resolving power of the system, so the higher the resolving power of the scintillator is, the more precise the diagnosis that can be performed. There is therefore a demand for a high resolving power scintillator.

Scintillators may use organic crystals such as anthracene, inorganic crystals such as sodium iodide doped with thallium, or ceramics such as PWO which have recently been developed, but even those with a fast luminescence decay time constant are only of nanosecond order. Among scintillators in practical use, barium fluoride is unique in having a decay time constant (600 picoseconds) of subnanosecond order (M. Laval, M. Moszynski, R. Allemand, E. Cormoreche, P. Guinet, R. Odru and J. Vacher, Nucl. Instru. Meth., 206 (1983) 169), but as its luminescence wavelength is in the ultraviolet region, there are severe practical restrictions to its use. Such inorganic scintillators can roughly be classified into two groups. The first group have a large luminescence quantum efficiency but a slow time constant of 200 nanoseconds or more (NaI(Tl), CsI(Tl), CsI(Na), BGO, $CdWO_4$), and the other group has a small luminescence quantum efficiency and a fast time constant of 1 to 30 nanoseconds ($BaF_2$, CsF, $CeF_3$, CsI, organic scintillators). For example, GSO(Ce) has an intermediate luminescence intensity and an intermediate time constant (60 nanoseconds), but its performance does not satisfy practical requirements (Carel W. E van Eijk, "Nuclear Instruments & Method in Physics Research Section A—Accelerators Spectrometers Setectors and Associated Equipment" Nucl. Instr. and Meth. A 392:(1–3)285–290 Jun. 21, 1997, 460:(1)1–14 Mar. 11, 2001).

Thus, an ideal scintillator has not yet been discovered, but the search for a material having a high luminescence intensity and a short time constant is continuing.

Problems to be Solved by the Invention

The Inventors already proposed a radiation detector using a two-dimensional stratified compound $(R-NH_3)_2MX_4$ as an organic/inorganic hybrid compound scintillator (Japanese Patent Application No. 2001-006132). This compound has an exciton with a very large bound energy in a self-organized quantum well structure. Its decay time constant is approx. 100 picoseconds, and of the scintillators which have so far been reported, it is therefore one of the substances with the shortest time from rise to disappearance of luminescence. However, as its crystallizing ability is low compared with inorganic crystals or ceramics, it is difficult to produce crystals having a large volume. Therefore, for detecting a high LET radiation pulse such as a heavy charged particle, sufficient scintillation efficiency can be obtained even with a spin coat film, but for detecting a low LET radiation pulse such as a γ-ray and high-speed electron beam, it has the disadvantage that its scintillation efficiency falls as the LET (linear energy transfer) decreases.

Means to Solve the Problems

This invention solves the above-mentioned problem, and provides a radiation detector using a scintillator having a large luminescence intensity and a short time constant.

Specifically, the Inventors discovered that when three-dimensional perovskite organic/inorganic hybrid compounds represented by the general formula $AMX_3$ (wherein, A, M, X are as described later) were excited by an ionizing radiation, intense radiation accompanied the relaxation step, this scintillation luminescence had a single peak in the visible region, and although the time from rise to disappearance of this luminescence was longer than in the case of the two-dimensional stratified compound $(R-NH_3)_2MX_4$, it was shorter than in the case of other ordinary scintillators.

Further, the Inventors succeeded in growing good quality, high volume crystals of this three-dimensional compound from a solution thereof, and discovered that in a test where it was irradiated with a short pulse electron beam, the radiation relaxation step was a high-speed exciton luminescence of subnanosecond order.

As the three-dimensional compound $AMX_3$ (wherein, A, M, X are as described later) does not have a multi-layer structure comprising an inorganic layer and organic layer as in the case of the two-dimensional compound $(R-NH_3)_2MX_4$, the exciton bound energy is low (in the former case, approx. 40 meV, and in the latter case, approx. 300 meV), however an exciton luminescence having a peak wavelength of 550 nm at room temperature was still observed.

This three-dimensional compound forms a three-dimensional network wherein clusters comprising six halogens X coordinated to a divalent metal are shared, so compared with the two-dimensional stratified compound $(R-NH_3)_2MX_4$, the crystallizing ability is high. Therefore, crystals of large volume can easily be obtained, and an improvement of scintillation efficiency for low LET radiation can be realized.

In view of the characteristics of this three-dimensional compound, the compound, and in particular its crystals, can be widely used as a high-speed response scintillator for ordinary ionizing radiations. On the other hand, the two-dimensional stratified compound $(R-NH_3)_2MX_4$ may be used for special cases as an ultra high-speed scintillator for very short super-single pulsed radiations, or as a scintillator for the simple detection of high LET radiations by a spin coat film of this compound. Therefore, these two compounds may be used in different situations according to the application.

In particular, crystals of the three-dimensional compound of this invention allow the detection of low LET radiations such as γ-rays and X-rays, which was difficult using the two-dimensional stratified compound of the prior art, and offer a higher time resolution than that provided by ordinary scintillators such as other inorganic crystals, organic crystals or ceramics.

Specifically, this invention is a radiation detector comprising as a scintillator an organic/inorganic perovskite hybrid compound represented by the general formula $AMX_3$ wherein A is $R-NH_3$ or $R'-NH_2$, or a mixture thereof, R is a hydrogen atom or a methyl group which may be substituted by an amino group or a halogen atom, R' is a methylene group which may be substituted by an amino group or a halogen atom, each X is a halogen atom that may be identical to or different from the other X groups, and M is a Group IVa metal, Eu, Cd, Cu, Fe, Mn or Pd. An example of this perovskite organic/inorganic hybrid compound where A is a mixture, is $(CH_3NH_3)_{(1-x)}(NH_2CH=NH_2)_xPbBr_3$ ($0<x<1$). This radiation detector is suited to detect low LET radiation, and in particular the low LET radiation is a pulse.

DETAILED DESCRIPTION OF THE INVENTION

Figure 1:
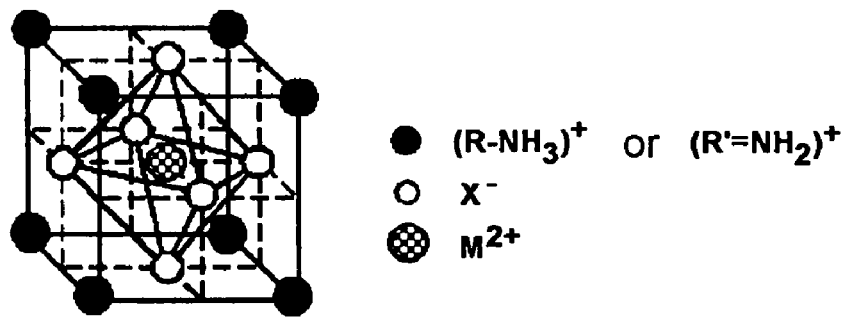
FIG. 1 shows the basic structure of an organic/inorganic perovskite hybrid compound according to this invention.

In the scintillator of this invention represented by $MX_3$ (wherein, A is R—$NH_3$ or R'=$NH_2$, or a mixture thereof), A is a monovalent cation with a small volume such as $[CH_3NH_3]^+$ or $[NH4]^+$. The two-dimensional organic/inorganic perovskite hybrid compound (R—$NH_3)_2MX_4$ of the prior art uses an alkyl group $(C_nH_{2n+1})$ wherein n is for example 2–18, as the hydrocarbon group R, and it has a multi-layer structure wherein inorganic layers formed by octahedronal clusters of a lead halide are separated by an organic material. However, in this invention, the volume of (R—$NH_3$) or (R'=$NH_2$) is less than the volume of lead halide clusters, so the inorganic layers are not separated by the organic material, an inorganic three-dimensional network is formed, and the organic material instead penetrates the gaps in the octahedronal clusters of metal halide. The basic structure at room temperature is shown in FIG. 1. FIG. 1 shows how the organic material represented by (R—$NH_3$) or (R'=$NH_2$), is occluded in the spaces between the metal (e.g., lead) halide of this invention.

The detector of this invention comprises a scintillator and a light-receiving device, a three-dimensional perovskite compound being used as the scintillator.

The three-dimensional perovskite compound used in this invention is the compound represented by the general formula $AMX_3$, where A is is R—$NH_3$ or R'=$NH_2$, or a mixture thereof.

Herein, the conditions regarding (R—$NH_3$) or (R'=$NH_2$) are that they should be monovalent cations of such a size that they can be occluded within the aforesaid three-dimensional compound. Specifically, R is methyl or hydrogen, and this methyl group may be substituted by an amino group or halogen atom. R' represents a methylene group, and this methylene group may be substituted by an amino group or halogen atom. Examples of this (R—$NH_3$) or (R'=$NH_2$) are H—$NH_3$, $CH_3$—$NH_3$ and $NH_2CH=NH_2$ (formamidinium cation). However, in the case of $C_2H_5$—$NH_3$, the product is a two-dimensional stratified compound (Japanese Unexamined Patent Application No.2001-006132), and not the three-dimensional compound of this invention.

X in the aforesaid general formula represents a halogen atom, preferably Cl, Br or I. From the viewpoint of stability of the compound, Br is most preferred, but from the viewpoint of low LET radiation detection, I which has a large atomic number is most preferred. Also, X may be a mixture of these halogens. M is a Group IVa metal, Eu, Cd, Cu, Fe, Mn or Pd, preferably a Group IVa metal or Eu, more preferably a Group IVa metal, still more preferably Ge, Sn or Pb, and most preferably Pb.

This scintillator is preferably a single crystal described hereafter, but it is not necessarily a single crystal, and may be a polycrystal for example coated by spin coating or the like on a solid substrate. This solid substrate must not emit luminescence which would interfere with measurements, therefore silicon crystals may for example be used.

As this scintillator emits light in the visible region, a photomultiplier or the like may be used as the light-receiving device. Typical examples are a construction wherein the scintillator is in contact with the light-receiving surface of the photomultiplier, a construction wherein the scintillator and the photomultiplier are connected by a light waveguide such as an optical fiber or the like, and a construction wherein the light emitted by the scintillator is received by a light-receiving port separated from the scintillator, this light-receiving port being connected to the photomultiplier by a light waveguide. The signal from the light-receiving device is processed by the usual method.

The scintillator in the radiation detector of this invention has a high crystal-forming ability, and single crystals of large volume can be formed. Therefore, the high-speed exciton luminescence can be applied not only to the detection of high LET radiation beams such as α-rays and heavy charged particle beams, but also to the detection of low LET radiation beams such as γ-rays, X-rays and high-speed electron beams. Further, it may also easily be applied to the detection of short pulses of low LET radiation beams which were difficult to detect in the prior art.

The radiation detector using the three-dimensional perovskite compound of this invention, e.g., $(CH_3NH_3)PbX_3$, has the following characteristics.

As the scintillator, i.e., the perovskite organic/inorganic hybrid compound of this invention, has an increased luminescence intensity the lower the temperature is, it is preferred to cool the measurement system.

The scintillator is easily manufactured. When the organic/inorganic hybrid compound deposits from an organic solution, a three-dimensional network of self-organizing lead halide clusters is formed, so it can be very economically mass-produced without requiring high temperature or high pressure as in the case or inorganic crystals or ceramic scintillators.

As the exciton luminescence peak of the organic/inorganic hybrid compound is unique (e.g., in the case of $(CH_3NH_3)PbBr_3$, 550 nm), the measurement system can be simply constructed from a light waveguide and light-receiving device alone.

Hereafter, this invention will be described by means of specific embodiments, but the invention is not to be construed as being limited in any way thereby.

EXAMPLE 1

60.22 g hydrobromic acid (HBr, Wako Pure Chemicals, concentration 0.48) was introduced in a 200 ml flask at room temperature, and 27.06 g of 40% aqueous methylamine solution (Wako Pure Chemicals, concentration 0.41) was gradually dripped in. As this is an exothermic reaction, the flask was placed in a water bath. Methylamine was dripped until the molar ratio of hydrobromic acid, HBr, to methylamine, $CH_3NH_2$, was 1:1. After addition was complete, the mixture was left with stirring for 1 hour to complete the reaction, and a colorless, transparent aqueous solution of methylamine bromide was thus obtained. When water was removed on an evaporator (water bath temperature 45° C.), a white powder of methylamine bromide remained. This was washed by diethyl ether (suction filtration), and after removing unreacted material, it was dried. The yield was 35.98 g, i.e., 90.0%.

Next, 18.8 g of the methylamine bromide obtained as mentioned above was dissolved in 100 ml DMF in a 200 ml three-necked flask at room temperature, and 61.62 g lead bromide, $PbBr_2$ (Highly Pure Chemicals, purity 99.99%) was added a little at a time until the molar ratio of methylamine bromide and lead bromide, $PbBr_2$, was 1:1. To avoid reaction between the moisture in the air in the three-necked flask, the mixture was left with stirring for 1 hour to complete the reaction while steadily passing a current of dry nitrogen through the flask, and a DMF solution (transparent and colorless) of the perovskite type compound, $(CH_3NH_3)PbBr_3$, was thereby obtained. The solvent was evaporated on an evaporator (water bath temperature approx. 80° C.), and a microcrystalline powder of a red perovskite compound remained. This was washed by diethyl ether to remove unreacted material, and dried. The yield was 78.41 g, i.e., 97.5%.

Figure 2:
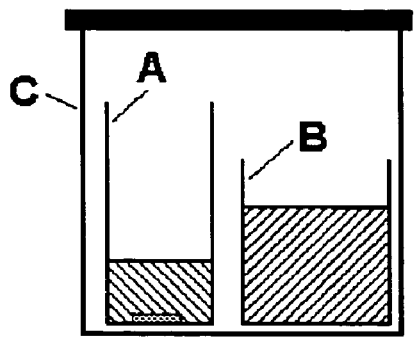
FIG. 2 shows a schematic view of a device for manufacturing single crystals of the perovskite compound by the poor solvent diffusion method. A is a glass bottle into which the perovskite compound is introduced, B is a glass bottle into which a poor solvent is introduced, and C is a desiccator.

Next, a single crystal of the perovskite compound used as the scintillator was prepared by the poor solvent diffusion method using the device shown schematically in FIG. 2 (Reimei Hirayama, "Organic Crystal Manufacturing Handbook", Chapter 8, "The Crystallization of Organometal Complexes", 2001, Maruzen Publishing Co.).

The microcrystalline powder of the obtained perovskite compound was dissolved in as little of a good solvent (dehydrated DMF) as possible, and undissolved material was filtered off using a filter having a retention capacity of about 0.1 micrometers (MILLIPORE, Millex-LG SLLGH_25NB). This solution was introduced into a container (glass bottle A) for depositing crystals. Glass bottle A was subjected to ultrasonic cleaning with pure water beforehand. Next, a poor solvent (toluene, diethyl ether, nitromethane, etc.) was introduced into a glass bottle B. In order to dehydrate the poor solvent, a little calcium chloride powder was also introduced into glass bottle B. Glass bottle A and glass bottle B were stored in a desiccator, sealed off from the atmosphere, and left for four days at room temperature. At this time, the poor solvent which evaporated from glass bottle B spread into the perovskite compound solution in glass bottle A so that the solubility of the solution in glass bottle A gradually fell, and red, transparent single crystals of perovskite type compound deposited on the bottom of glass bottle A. Glass bottle A was shaded by wrapping the whole desiccator in aluminum foil. Of the single crystals thus obtained, those with the largest volume measured 1 cm×1 cm×5 cm.

Figure 3:
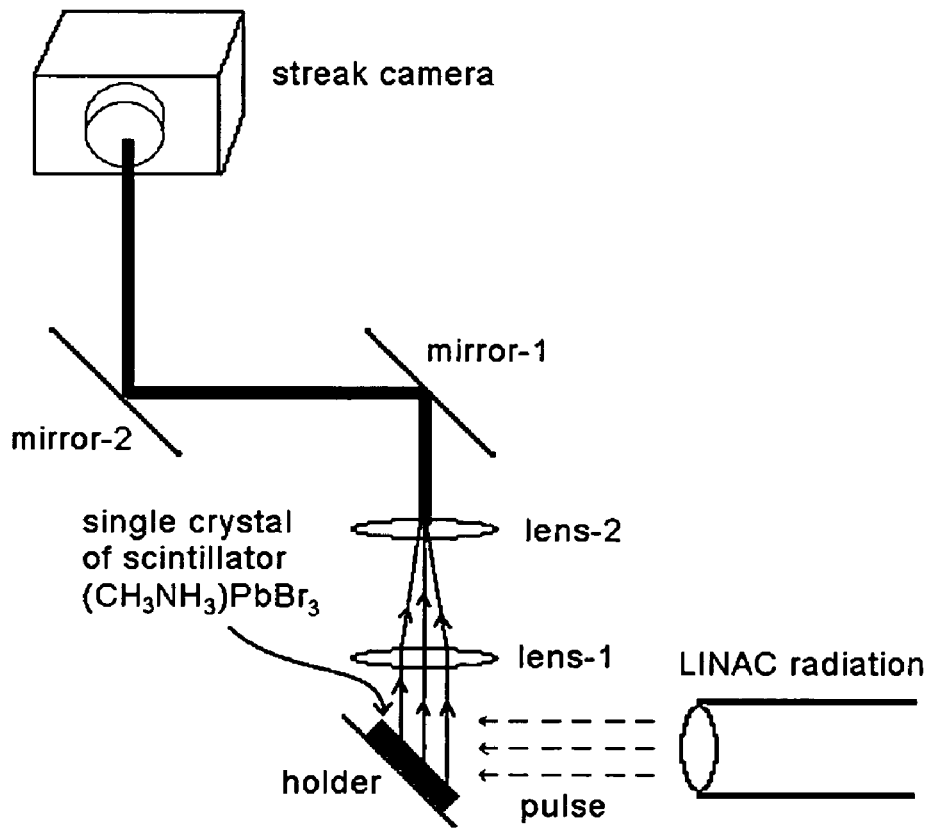
FIG. 3 shows a schematic view of a device which excites single crystals of PbBr $(CH_3NH_3)_3$ using the electron beam pulse of a linear accelerator (LINAC), and allows observation of the luminescence.
Figure 4:
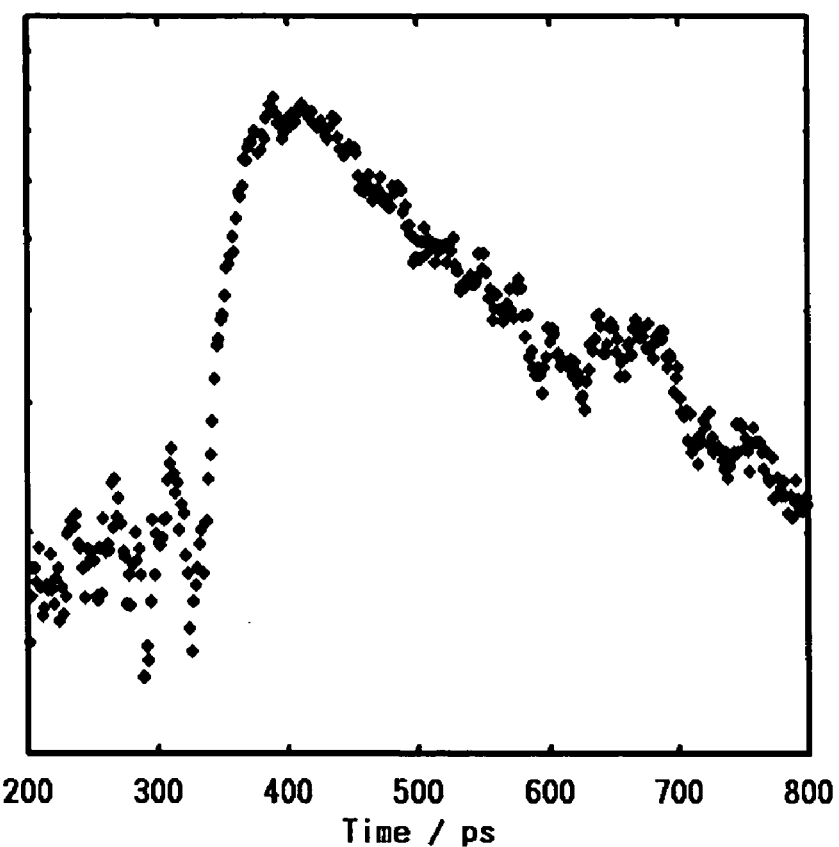
FIG. 4 shows the time profile of the scintillation of PbX $(CH_3NH_3)_3$.

When the obtained single crystals were excited using an electron beam pulse of 200 femtoseconds accelerated to 30 MeV by a linear accelerator (LINAC) in vacuo (approx. $10^{-6}$ torr), a luminescence with a peak wavelength of 550 nm was observed. The time transition of luminescence intensity of this luminescence was measured using a streak camera (Hamamatsu Photonics, Inc., FESCA-200) with a resolving time of 260 femtoseconds as light-receiving device. This device is shown schematically in FIG. 3, and the result is shown in FIG. 4. As a result of this numerical analysis, the decay time constant of this luminescence was approx. 240 picoseconds.

EXAMPLE 2

While varying the temperature of the single crystals manufactured in Example 1, a scintillation luminescence spectrum from the sample was measured by irradiating it with hydrogen ions of 2.0 MeV using a Van der Graaf accelerator (Tokyo University Atomic Energy Research Center). The measurement result showed an identical relation to the relation between luminescence intensity due to irradiation with ultraviolet light (He—Cd laser), and temperature.

Figure 5:
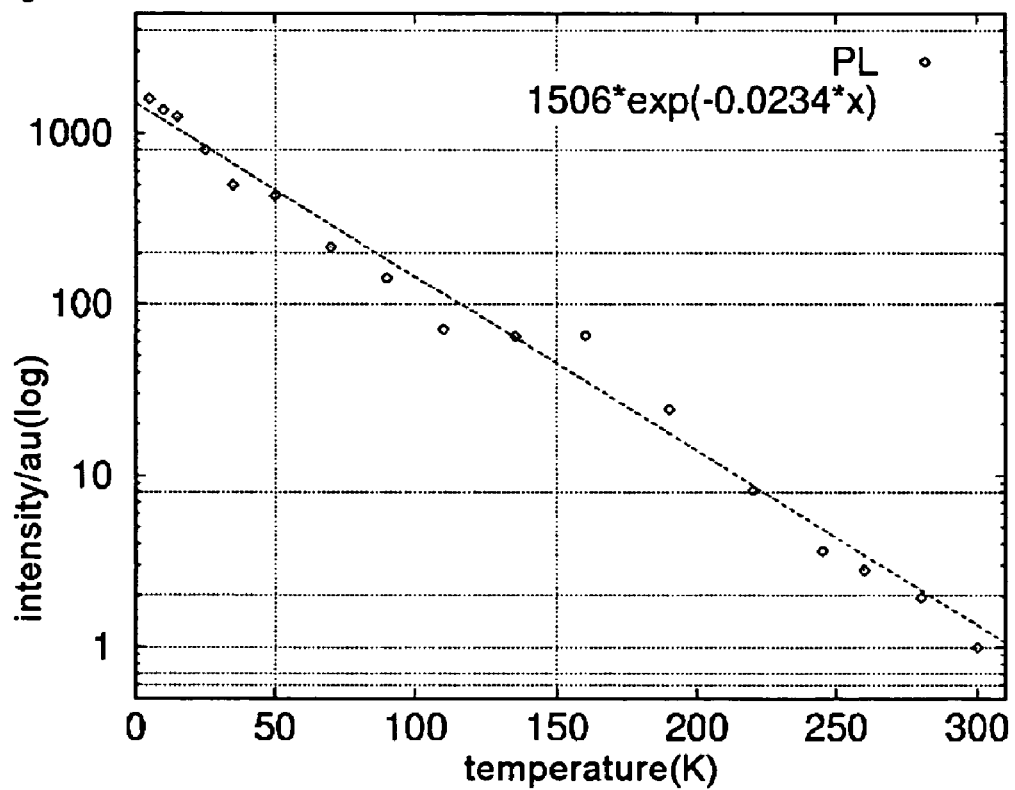
FIG. 5 shows the temperature dependency of the luminescence intensity (ultraviolet irradiation) of single crystals of the perovskite compound.

The result of irradiation with ultraviolet light is shown in FIG. 5. Taking the reference value of luminescence intensity for NaI(Tl) as 100, the luminescence intensity of this compound at 300K was 0.075, and at 25K was 140. The luminescence intensity decreases exponentially as a function of the absolute temperature.

EXAMPLE 3

In this example, the single crystal manufactured in Example 1 was irradiated with γ-rays, and it was confirmed that this single crystal could detect the γ-rays.

Figure 6:
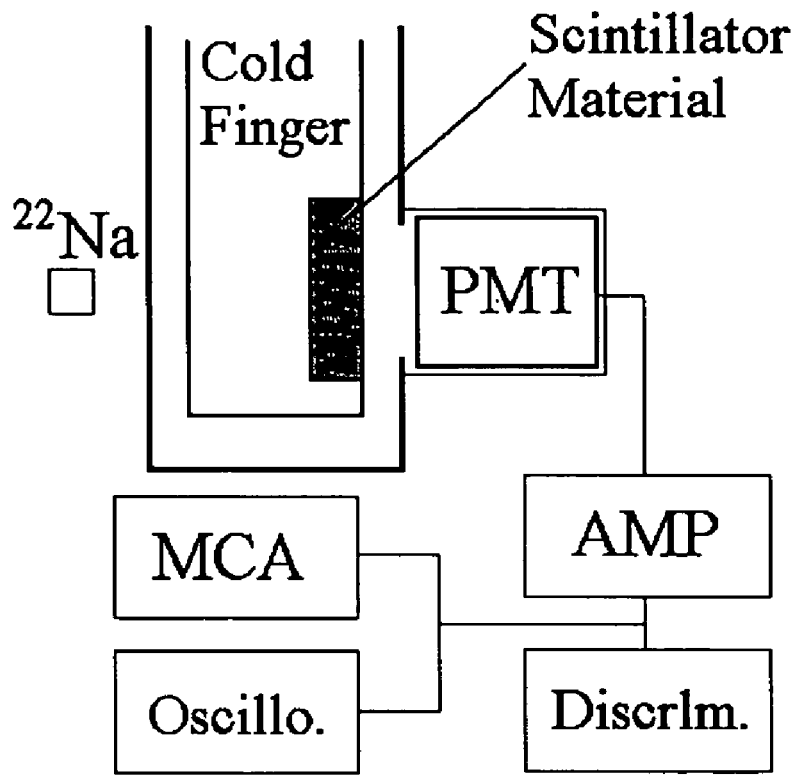
FIG. 6 shows a device showing that single crystals of the perovskite compound can detect γ-rays.

A schematic view of the system used in this test is shown in FIG. 6. $^{22}$Na was the sealed source of the γ-rays, and the intensity was 370 Bq (Becquerels). The single crystal was sealed in a cryostat cold finger, and cooled to 40K. The luminescence was directly received by a PMT (photomultiplier, Phillips, XP4222B) attached to a quartz glass window. The signal from the PMT was amplified by an AMP, and recorded as an energy spectrum by an MCA (wave height discrimination machine). The result is shown in FIG. 7.

Figure 7:
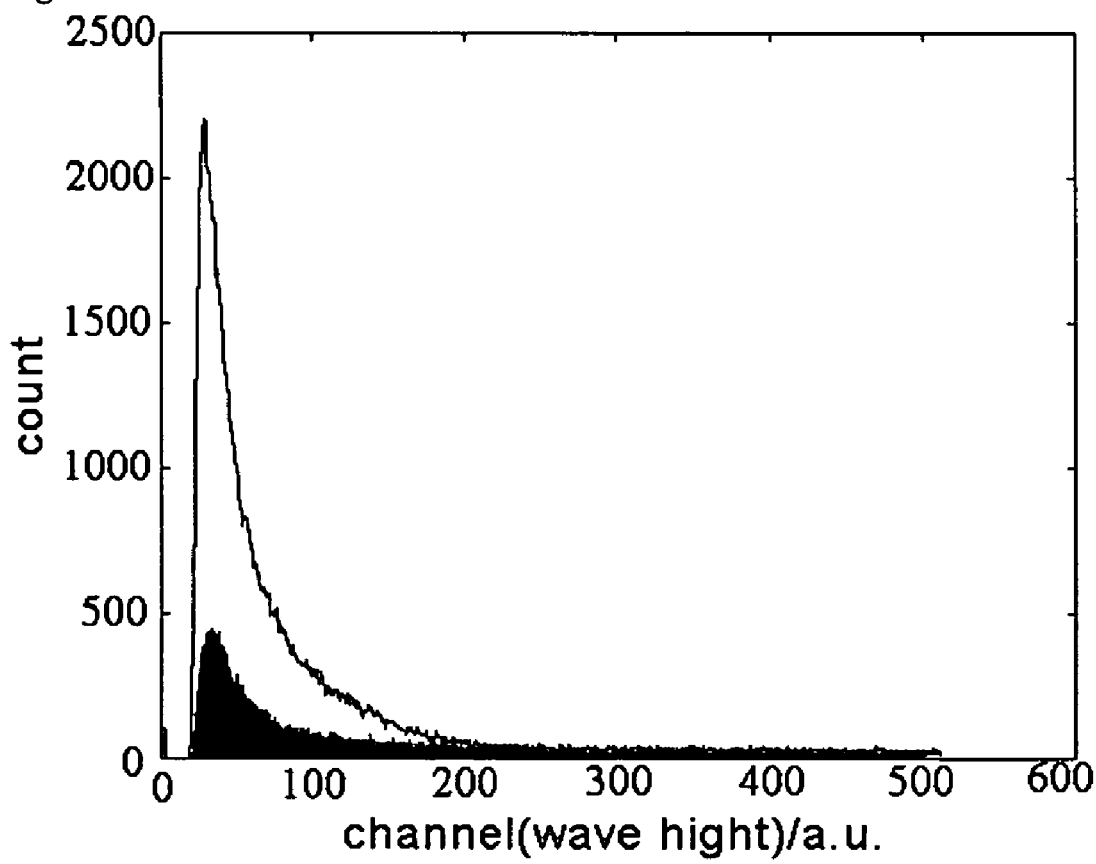
FIG. 7 shows the scintillation emission spectrum when single crystals of the perovskite compound are irradiated by γ-rays.

In FIG. 7, the solid line shows the signal intensity when the single crystal was installed and cooled to 40K. On the other hand, the black shaded part shows the noise level for the signal intensity when there is no scintillator crystal. From the difference, it can be seen that the single crystal emits a scintillation luminescence when γ-rays are received.

What is claimed is:

1. A radiation detector comprising as a scintillator an organic/inorganic perovskite hybrid compound represented by the general formula $AMX_3$, wherein A is R—$NH_3$ or R'—$NH_2$, or a mixture thereof, R is a hydrogen atom or a methyl group which may be substituted by an amino group or a halogen atom, R' is a methylene group which may be substituted by an amino group or a halogen atom, each X is a halogen atom that may be identical to or different from the other X groups, and M is a Group IVa metal, Eu, Cd, Cu, Fe, Mn or Pd.

2. The radiation detector according to claim 1, wherein the form of said organic/inorganic perovskite hybrid compound is a single crystal.

3. The radiation detector according to claim 2 which is adapted to detect low LET radiation.

4. The radiation detector according to claim 3, wherein said low LET radiation is a pulse.

5. The radiation detector according to claim 1 which is adapted to detect low LET radiation.

6. The radiation detector according to claim 5, wherein said low LET radiation is a pulse.

* * * * *